United States Patent [19]

Backus

[11] 3,960,121

[45] June 1, 1976

[54] ENGINE COMBUSTION SYSTEM

[75] Inventor: Harold Adams Backus, Wynnewood, Pa.

[73] Assignee: Backus Devices, Incorporated, Pa.

[22] Filed: May 30, 1974

[21] Appl. No.: 474,791

Related U.S. Application Data

[63] Continuation of Ser. No. 153,584, June 16, 1971.

[52] U.S. Cl. .................... 123/34 A; 123/122 G; 123/3; 431/75
[51] Int. Cl. .................. F02b 3/00; F02b 43/08; F02m 31/00
[58] Field of Search ............ 123/122 G, 34 R, 34 A, 123/3; 431/75, 80, 63

[56] References Cited
UNITED STATES PATENTS

| | | | |
|---|---|---|---|
| 961,059 | 6/1910 | Abbott | 123/34 A |
| 1,064,086 | 6/1913 | Porter | 123/34 A |
| 1,876,168 | 9/1932 | Richardson | 123/34 A |
| 1,891,444 | 12/1932 | Reichhelm | 123/34 A |
| 2,079,632 | 5/1937 | Rector | 123/34 A |
| 2,122,684 | 11/1935 | French | 123/34 A |
| 2,760,467 | 8/1956 | August | 123/34 A |
| 2,915,377 | 12/1959 | Reichhelm | 123/122 G |
| 3,687,122 | 8/1972 | Kamo | 123/122 G |

FOREIGN PATENTS OR APPLICATIONS

| | | | |
|---|---|---|---|
| 716,377 | 12/1931 | France | 123/34 A |
| 308,961 | 9/1933 | Italy | 123/34 A |

*Primary Examiner*—Charles J. Myhre
*Assistant Examiner*—Ronald B. Cox
*Attorney, Agent, or Firm*—Larson, Taylor and Hinds

[57] ABSTRACT

An engine combustion system is provided wherein fuel is supplied to the engine combustion chamber in the form of a hot vapor. The system preferably includes a preburner wherein a portion of a liquid fuel supply is burned internally to provide a hot, gaseous admixture of gasified fuel and products of combustion. A portion of the output of the preburner is used to heat air induced into the intake manifold, the heated air being thence supplied to the combustion chamber. The output of the preburner can also be used in auxiliary units such as a heating system for the passenger compartment. For a piston-type engine, the gaseous fuel is released into the combustion chamber formed by the clearance volume above the piston at the top center position of the piston, air being compressed within a recess in the cylinder during the cylinder head and rushing past the fuel inlet upon the downstroke of the piston to provide thorough mixing and, hence, complete burning of the gaseous fuel. The system described also includes temperature and pressure controls for both normal operation and startup as well as hydraulic controls for the fuel release valve assembly, the fuel release valve assembly including both an operator-controlled metering valve and an engine speed responsive poppet-type timing valve.

17 Claims, 17 Drawing Figures

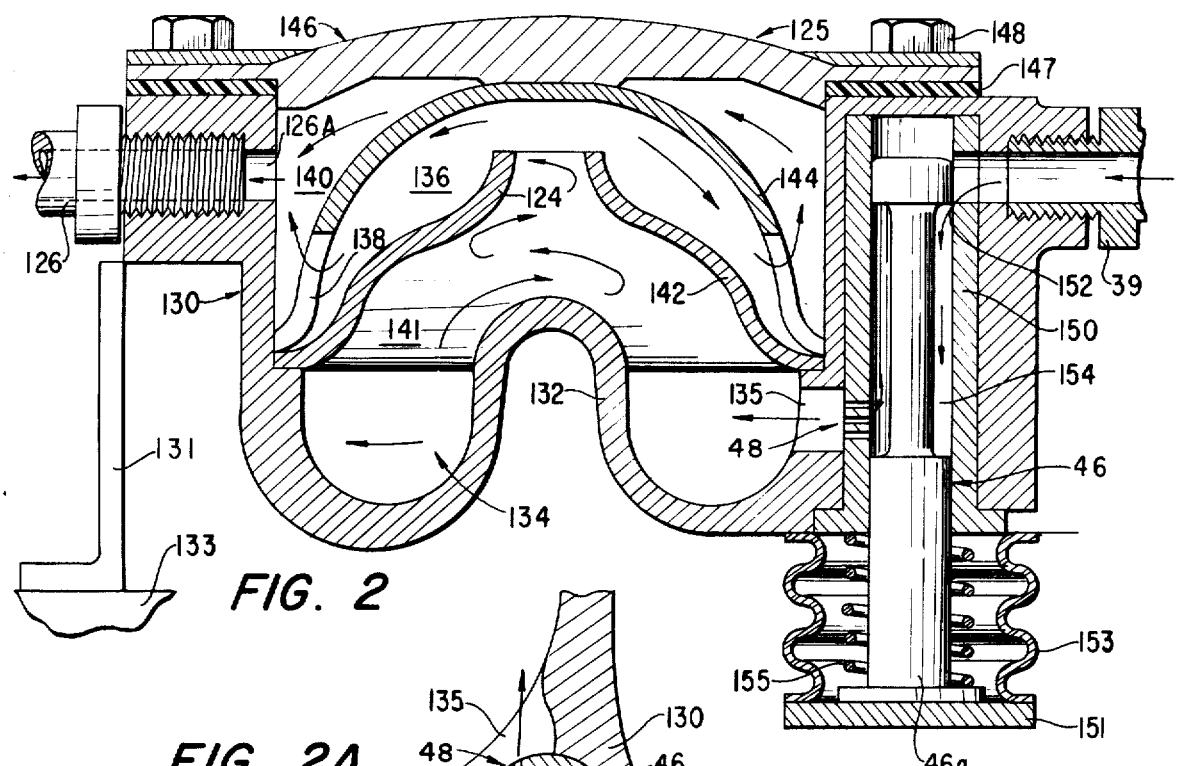
FIG. 2
FIG. 2A
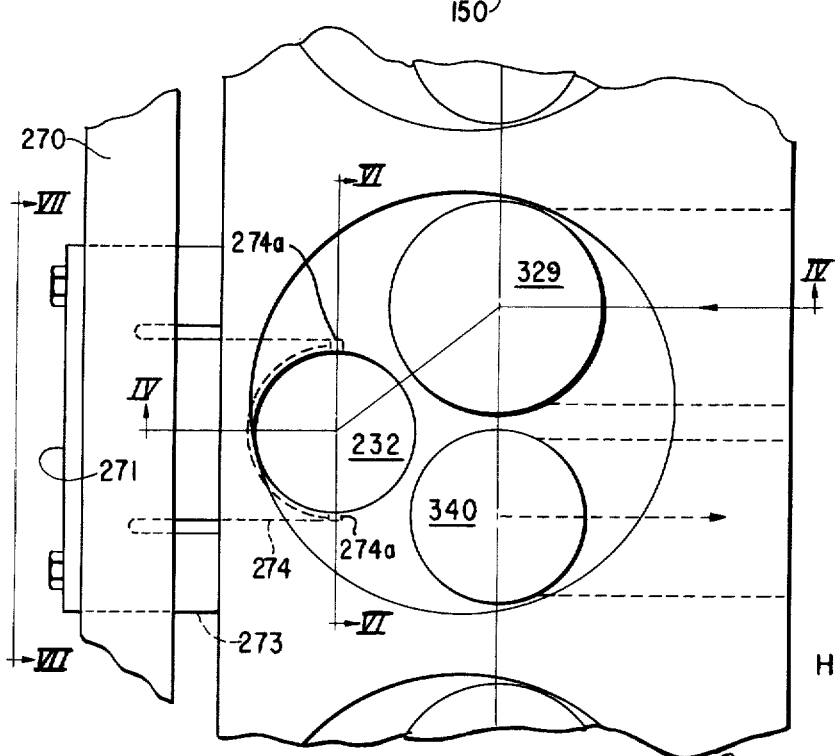
FIG. 3
INVENTOR
HAROLD A. BACKUS
Larson, Taylor and Hinds
ATTORNEYS U.S. Patent  June 1, 1976  Sheet 4 of 6  3,960,121

INVENTOR

HAROLD A. BACKUS

Larson, Taylor and Hinds

ATTORNEYS

INVENTOR
HAROLD A. BACKUS
ATTORNEYS

INVENTOR

HAROLD A. BACKUS

Larson, Taylor and Hinds
ATTORNEYS

ENGINE COMBUSTION SYSTEM

This is a continuation of application Ser. No. 153,584 filed June 16, 1971.

FIELD OF THE INVENTION

The present invention relates to engines and engine systems and, more particularly, to an improved engine and engine system which, among other features thereof, emits a substantially lower percentage of pollutants in the exhaust.

BACKGROUND OF THE INVENTION

Particularly with the advent of positive legislation in this area, it is something of an understatement to say that a great deal of attention is being paid to the reduction of engine pollutants. Because of the broad applicability of certain aspects of the invention, the disadvantages of present engines will be generally considered particularly regarding this area of emission of pollutants.

Internal combustion devices, such as engines and jet turbines, suffer from substantially incomplete combustion and the generation of large quantities of unacceptable pollutants. These defects are, of course, related and together constitute a serious departure from optimum operating conditions. Although external combustion devices and in particular those employing gaseous fuels, are inherently cleaner burning, such devices are capable of improvement in this area and in addition suffer other disadvantages.

Considering some of the conventional engine types, in Diesel-type engines the direct injection of liquid fuel requires that about two-thirds of the time in each cycle between the instant at which injection starts and chemical combustion is completed be taken up with purely mechanical and thermal procedures involving penetration and atomization of the liquid fuel and the vaporization and heating of the atomized fuel to self-ignition temperatures. This can permit the injection of a considerable amount of fuel into the cylinder before ignition occurs, thus causing pseudo-explosive pressure peaks. Such operation not only prevents limiting the cylinder pressure during the cycle to reasonable values but also raises the peak operating temperatures. In addition, the ignition time delay imposes a limit on the engine operating speeds. Further, Diesel type engines use a very high compression pressure to ensure that the final compression temperature, starting from low ambient temperatures, is sufficient to supply heat to the atomized fuel and still remain at or above self-ignition temperatures. These high pressures require stronger and hence heavier weight components and combined with the speed limitations of the combustion cycle, represent serious disadvantages. These remarks, of course, also apply to hot bulb-type Diesel engines, which use an ante-chamber for initial combustion and inject the contents of the ante-chamber into the main cylinder space, particularly regarding speed and maximum power restrictions.

Both Diesel type and spark ignition engines permit, and, in general, strive for, the development of high peak temperatures during the cycle. As discussed in more detail hereinbelow, the formation of oxides of nitrogen is considered to be directly related to such peak temperatures and the attempted elimination or reduction of these serious pollutants has made necessary the addition of expensive and bulky reactor devices or the like to the exhaust line. In this regard, because both Diesel type and spark ignition engines have tended to operate at fuel to air ratios which do not provide sufficient air, considering turbulence factors, to secure complete combustion, current trends have been to inject more air into the exhaust manifold to oxidize the unburned fuel at high temperatures, the usual exhaust manifold being modified to permit this. Such an approach has obvious disadvantages. In a further somewhat related approach exhaust gases are recirculated into the inlet manifold to partially combat the formation of oxides of nitrogen. Among the disadvantages of this approach is that it reduces the power output of the engine and causes problems in vehicle operation.

Carburetor type engines also suffer other disadvantages such as problems regarding providing equal cylinder distribution of the combustible flow as well as regarding vaporization under varying conditions. Carburetor icing caused by a temperature drop in the venturi flow is also a problem. Further, carburetor type engines have cold starting difficulties which require such over-rich fuel mixtures as to be incompatable with acceptable pollutant emissions. In this regard, it is noted that the engine starting period causes higher than average pollutant emissions for all conventional engines.

Other engine types suffer other disadvantages. For example, turbine engines, using liquid fuels injected into compressed air from the compressor, suffer from incomplete combustion and the high temperature formation of oxides of nitrogen. On the other hand, engines burning propane gas are encumbered with bulky fuel supply tanks and are limited insofar as available recharging facilities are concerned.

The literature, of course, includes extensive discussions of the various approaches taken in the area of pollutant emissions control. It should be noted that, apart from approaches involving improved ignition timing, devices employing these approaches largely act downstream of the engine to provide such control. However, it is thought that, rather than discuss these approaches in more detail or, more generally, rather than discuss the various engines referred to hereinabove in more detail than has been done, a greater understanding of the disadvantages of the prior art engines and pollutant control techniques and the advantages of the present invention can be gained through considering the present invention itself.

SUMMARY OF THE INVENTION

In accordance with the present invention, a system is provided which eliminates or reduces the effects of the problems associated with systems of the prior art. Considered regarding the broadest aspects thereof, the invention involves supplying completely gaseous or gasified fuel to an air-containing volume within an engine for combustion with the air supplied to that volume. Preferably, both the fuel and air are heated, but at least one or the other is heated above the critical temperature at which autoignition of the fuel and air mixture takes place. Further, gaseous fuel is made to burn within the air-containing volume at a rate substantially proportional to the rate of entry of the fuel into that volume.

By bringing the fuel into the presence of the air in a completely gaseous state and by providing that the temperature of the fuel and air mixture is sufficient for self-ignition, the thermal and chemical lags characteristic of such burning are minimized. As discussed above, a serious disadvantage of spark ignition engines, diesel engines, and jet engines heretofore has been that the vaporization of the fuel takes place after the injection phase, rather than before, thus meaning that either, or both, the fuel and the air require subtraction from the total combustion process to bring that one, or both, individually up to the conditions of fastest ignition and flame travel. Hence, it is an important feature of the invention that, by heating and vaporizing the fuel in the preburner before release into the engine cylinder combustion space, the requirement for vaporization of the fuel in the combustion chamber is eliminated. As mentioned, the droplets of fuel passing into the combustion space in conventional systems require a finite time before vaporization takes place, and it is noted that this time may be of the same order as the time of residence of the fuel in the combustion phase meaning that all of the fuel may well not be vaporized.

One further very important feature of the system of the invention is that only relative low temperatures are required, thus resulting in a lowering of the pollutants produced. Because carbon monoixde can be almost completely oxidized to carbon dioxide and water at temperatures below that at which the various oxides of nitrogen (generally referred to as $NO_x$ gases) form, by controlling the temperature of combustion the formation of these very difficult to control pollutants can be prevented. This approach of reducing $NO_x$ gases is clearly superior to other methods now used such as (1) adding an inert gas, as through feeding back the exhaust gas to the intake manifold, to decrease the peak cycle temperature without increasing the oxygen concentration, (2) burning a lean mixture, and (3) reducing such oxides. In this regard, it is noted that the method involving adding an inert gas acts to reduce the available power by reducing the available oxygen per cycle whereas burning a lean mixture is only a contributory factor to reducing the $NO_x$ content and does not reduce greatly these oxides. Further, burning a lean mixture results in a rougher running engine.

In jet engines, the approach has been to burn the whole mass of fuel under stoichiometric conditions, thus allowing very high temperature conditions to develop. In accordance with this approach, it is only later, after the nitrous oxides are generated, that the mass of products of combustion is diluted, the critical temperature at which nitrogen and oxygen begin to react apparently being about 3500°F. Thus, a distinction should be made between the usual process of first burning fuel at nearly stoichiometric proportions of fuel and air and then diluting the products of combustion which are at undesirably high temperatures and the process of the invention wherein fuel is burned in the presence of sufficient excess air in the first instance so as to prevent the formation of masses of products of combustion at such high temperatures of combustion. The present invention entirely eliminates carrying out the function of converting the liquid fuel to gaseous fuel within the combustion chamber of the engine, the fuel being completely gasified before reaching the chamber. Further, the gaseous fuel is fed continuously (for a specific period) into an excess of air and turbulently mixed therewith, so that each particle of gas can find its required air "quantum", and combustion can proceed with intimate and immediate cooling provided by the excess surrounding air. Thus, there is only one phase within the combustion chamber, and complete burning is accomplished at lowered temperatures. The process might be compared to mixing concentrated acid with water; the water is stirred vigorously, and the acid is dripped in to prevent local mass "boiling" and like effects. It will be understood that the provision of air substantially in excess of the theoretically required amount is essential in controlling the production of contaminants.

It is noted that the reduction of the maximum temperature during combustion, as provided in accordance with the present invention, is quite effective in reducing the $NO_x$ output of an engine, but is incompatible with conventional spark ignition and diesel cycles in that very high temperatures and pressures are characteristic of such cycles. Further, if the peak temperatures of combustion in the engine cylinders are reduced by enriching the carburetor mixture and retarding the spark so as to lower the oxygen concentration in the combustion chamber, there will be a resultant increase in the volume of unburned hydrocarbons which, in accordance with such an approach, must be burned by thermal reactors or the like located in the exhaust system. The high temperatures generated by thermal reactors require special heat resisting materials and hence, such devices are items of considerable expense. Thus, it will be appreciated from the foregoing that considerably more is involved than merely reducing engine temperatures.

It should be pointed out that reducing the peak pressures and temperatures in the cylinders does not result in a corresponding increase in fuel consumption. On the other hand, there is a substantial reduction in heat transfer in the system so that the cooling losses are reduced during the phase of the cycle which is of decisive importance regarding efficiency, namely, the upper top dead center range. In addition, the decrease in pressure results in a reduction in mechanical losses.

It is noted that the system of the present invention does not, in contrast to carburetor-type engines, produce an increase in polluting emissions on acceleration or deceleration. A lack of oxygen during deceleration is a primary factor in the formation of high volumes of carbon monoxide and because the present system, like diesel engines, utilizes fuel injection, there is always an excess of oxygen present. Further, the emission of oxides of nitrogen rises sharply during acceleration in conventional engines, generally in accordance with the increase in compression pressures and temperatures. As mentioned hereinabove, the reduction in peak engine temperatures for all operating conditions provided in accordance with this invention favors minimum production of these oxides.

A number of other features of the invention are also of considerable importance. For example, in accordance with a further feature of the invention, as incorporated in a piston engine, the gaseous fuel is injected into the clearance space above the piston during the "top center" position of the piston, not into the intake manifold or into the cylinder early in the compression stroke. Further, the air to be mixed with the gaseous fuel is made to flow past the fuel release assembly during fuel injection, the air flow being in the form of a thinned out, annular sheet and striking the fuel, which is also released in the form of a thin annular sheet, at an angle substantially transverse to the direction of the fuel flow. The resultant turbulent mixing of the air and fuel, which is enhanced in other ways as well, produces thorough, complete mixing and, hence prevents the formation of unburned masses of fuel within the combustion volume. In this way, and in conjunction with the elimination of liquid particles, combustion can be made to begin at relatively low temperatures as compared with systems of the prior art.

In accordance with a presently preferred embodiment of the invention, the air flow discussed above is provided by the release of compressed air stored during the upstroke of the engine position in a recess, which surrounds the fuel release assembly. Hence, a two stage diffusion process is provided, first, by flow from the recess, which is restricted in the area of the fuel inlet to provide a venturi effect and, second, by creating maximum turbulence in the clearance space above the piston.

Because certain of the other features of the invention can best be understood in the context of the particular subsystem of the invention of which they are part, and rather than unduly prolong considering the present invention in a summary way, reference is now made to the description of presently preferred embodiments of the invention found hereinbelow, other features and advantages of the invention being set forth or apparent from that description.

BRIEF DESCRIPTION OF THE DRAWINGS

FIG. 2 is a sectional view of the preburner of FIG. 1;

FIG. 2A illustrates a detail of the preburner of FIG. 2;

FIG. 3 is a plan view of the valve assembly illustrated schematically in FIG. 1;

DESCRIPTION OF THE PREFERRED EMBODIMENTS

Figure 1:
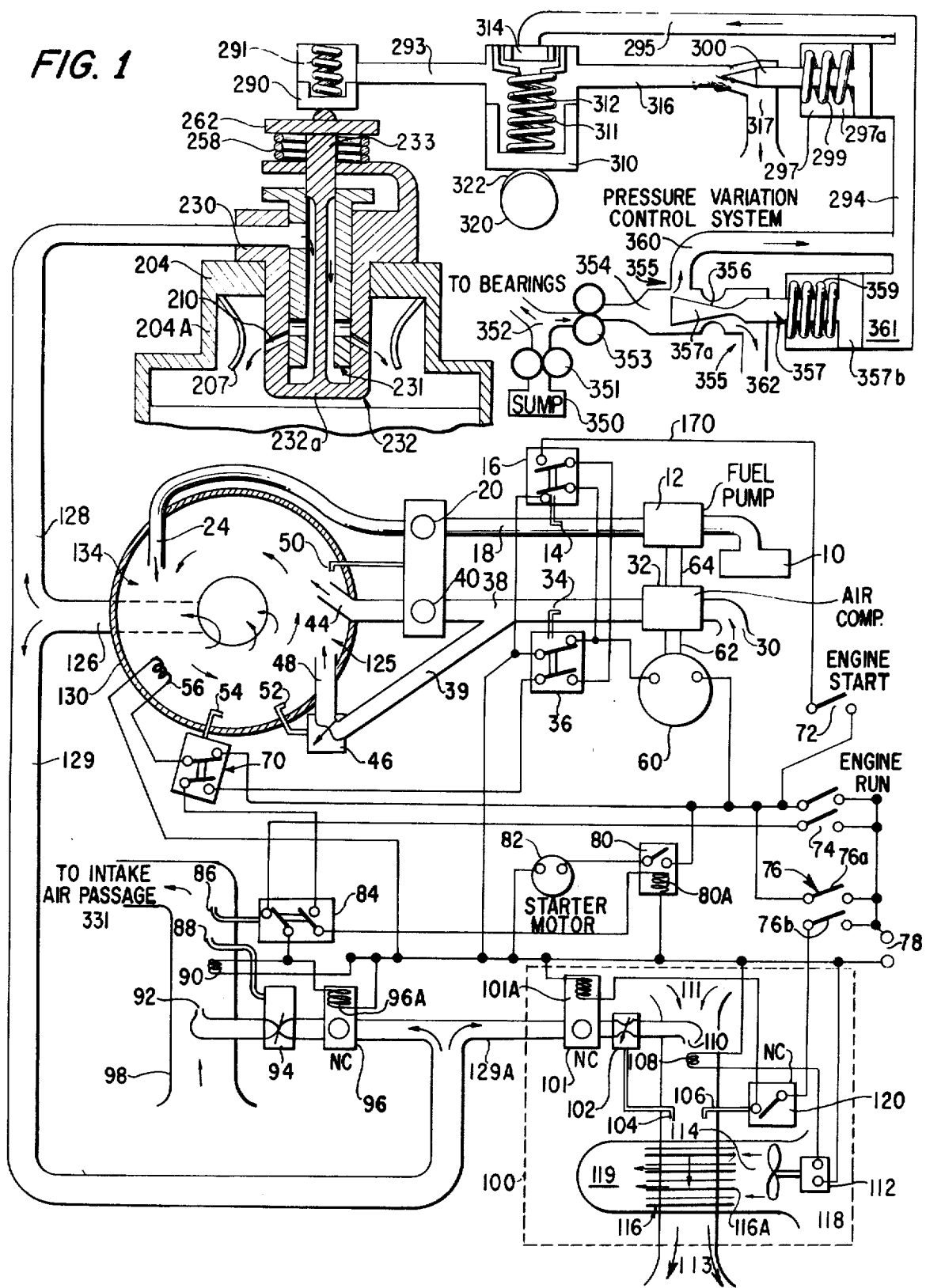
FIG. 1 is a schematic diagram of a presently preferred embodiment of the system of the invention.

Referring to FIG. 1, a schematic representation of an engine system incorporating the present invention is shown. The engine system illustrated is an automobile engine although as explained hereinbelow further applications are, of course, contemplated.

The system includes a preburner 125 which, in accordance with an important feature of the invention, produces a hot vapor mixture of fuel and products of combustion for injection into the engine cylinders. Fuel, in liquid or gaseous form, and air are injected into preburner 125 through injection nozzles 24, 44 and 48, fuel being injected through nozzle 24 and air being injected through nozzles 44 and 48. Preburner 125 converts a relatively cold fuel into the relatively hot gaseous fuel mentioned above by burning a small percentage of fuel in the air supplied to the preburner. The temperature of the gas mixture within preburner 125 should be substantially that required for auto-ignition upon injection, so that heat does not have to be transformed from the compressed air mass within the engine cylinder for this purpose at the time of injection.

The pressure of the gas mixture must be substantially greater than the cylinder pressures during such injection period in order that such a flow can exist. It is, therefore, not only necessary, but highly desirable, to so limit the pressure rise during the combustion process, when the fuel supply valve is open, that the flow of such fuel not be stopped by the counter pressure of such combustion process. Such a thermodynamic cycle is, of course, the classic "limited pressure" cycle.

The construction of preburner 125 is discussed in more detail hereinbelow in connection with FIG. 2; however, it should be noted that preburner 125 includes a lower swirl chamber 134 and that nozzles 24, 44 and 48 are positioned to provide an output jet of spray which is generally tangential to the walls of the swirl chamber 34 as shown. This provides a tangential or rotational "swirling" motion of the air and fuel within swirl chamber 134 and a consequent relatively turbulent or violent mixing of the air and fuel. A heater device such as a glow plug or the like indicated schematically by heating coil 56, is positioned within the range of the liquid fuel spray nozzle or jet to provide initial ignition.

While it is possible in accordance with the present invention to convert to a gas mixture in preburner 125 at relatively low pressures, and to subsequently increase the pressure for injection purposes by compressing the gas mixture, according to a preferred embodiment the pressures in the fuel and in the air supply lines are first increased by means of a pumping unit or its equivalent as described hereinbelow and the temperature of the pressurized flow through the preburner 125 raised by the combustion process within preburner 125 itself, thus requiring only that the output of the preburner 125 be distributed by an output manifold 128 to each cylinder for release in an injection procedure. The fuel is supplied through a fuel line 18 to preburner 125 from a conventional fuel tank 10 by means of a fuel pump 12 whereas air is supplied to preburner 125 from an air intake 30 through the action of an air compressor 32. Compressed air from compressor 32 is supplied through suitable ducting 38 to nozzles 44 and 48.

The preburner 125, in a typical design, may be operating at a pressure of approximately 600 p.s.i. and at a temperature of approximately 700°F, subject to slight fluctuations caused by the balance between demand from the controlled injection valves or the like described below and the supply from the pumping unit. The injection valves are subjected to external controls such as throttle or accelerator operations, which impose variable demands for volume flow upon the preburner. To keep the pressure in the main manifold 128, or in auxiliary line 129 described below, approximately constant, therefore, three control valves 20, 40 and 46 are utilized. As illustrated, ducting 38 branches into another path 39, the main path 38 leading to nozzle 44 through control valve 40, which is mentioned above and is controlled by a pressure regulator or sensor indicated schematically at 50, and the path 39 leading to nozzle 48 through control valve 46. Valve 46 is controlled by a temperature regulator or sensor 52 which includes a thermal control device responsive to the temperature in preburner 125. Regulator 50, which also controls actuation of control valve 20 in fuel line 18, serves to regulate the fuel pressure in line 18 and the air pressure in duct 38 in accordance with the pressure within preburner 125. Regulator 52 operates such that a reduction from the desired working temperature in the outlet from the preburner will result in slightly more air being injected by nozzle 48 into the mass of fuel vapor and products of combustion in preburner 125. In operation, regulator 52 will, for example, admit more than usual amounts of air during "start-up" so that more fuel will be burned to provide a rapid heat-up period. The pressure regulator 50 provides simultaneous operation of the associated air and fuel valves in a predetermined ratio to permit a rapid change in the total input to preburner 125. Any inexactness of the performance of regulator 50 in metering fuel and air to nozzles 24 and 44 resulting in unacceptable temperature levels within preburner 125 will be made up for to the extent appropriate by temperature controlled valve 46.

The regulator system for fuel nozzle 24 and air nozzles 44 and 48 also includes first and second pressure-sensitive switches 16 and 36. Switches 16 and 36 include pressure sensors 14 and 34, respectively, and are part of an electric control circuit described hereinbelow.

Both air compressor 32 and fuel pump 12 are mounted on a common shaft 64 driven by an electric motor 60. Motor 60 is preferably powered independently of the engine so that motor 60 can initiate the process of preparation of fuel for injection before the engine itself is cranked over by a starting or starter motor 82 described hereinbelow. Hence, motor 60 is preferably an electric motor, a compressed air motor, or the like, and can be connected to the engine by an overrunning, oneway drive, mechanical or electrical clutch (not shown) so that motor 60 is free to rotate under its own power when the engine is not running, but can be driven by the engine when the latter is rotating at a speed at least equal to the minimum speed of motor 60.

Motor 60 is connected through one set of contacts of double-pole "engine run" switch 74 to a positive supply terminal of a power supply 78, preferably in the form of a standard D.C. automobile battery. Motor 60 is also connected through the normally closed contacts of pressure switches 16 and 36, as illustrated, to a negative supply terminal of power supply 78. The normally closed contacts of switches 16 and 36 are connected in series and if both of these switches are actuated, the supply circuit for motor 60 will be broken, hence de-energizing the fuel pump 12 and air compressor 32.

The electric control circuit also includes the engine starter motor 82 and a relay-controlled switch 80 connected in series therewith across the supply terminals of power supply 78. Switch 80 is controlled by a control relay 80A connected between the terminals of power supply 78 in series with the normally open contacts of switches 16 and 36 as well as a momentary-type engine starter switch 72 and the normally open contacts of temperature-sensitive switches 84 and 70 described hereinbelow.

Temperature-sensitive switch 70 includes a temperature sensor 54 which senses the temperature within preburner 125 and controls actuation of the switch 70 in accordance therewith. The normally closed contacts of switch 70 are connected in series with heating coil 56 (and switch 76) between the terminals of power supply 78. Hence, when the temperature within preburner 125 exceeds a predetermined value, switch 70 will be actuated and the current supply for heating coil 56 removed. Further, as explained hereinbelow, closing of the normally open contacts of switch 70 is essential to energization of starter motor 82.

Temperature-sensitive switch 84 is part of a system for heating intake air so that the temperature of the air aspirated into the engine can be brought up to a predetermined minimum value before the engine is started. Switch 84 includes a temperature sensor 86 which senses the temperature within an intake manifold 98, the normally closed contacts of switches 84 completing a circuit between the parallel combination of a heating coil 90 and a control solenoid 96A and the terminals of power supply 78. Solenoid 96A controls actuation of a cutoff valve 96 which controls the passage of the fuel admixture from preburner 125. The output of preburner 125 is conducted through a main conduit 126 which branches into an auxiliary 129 in which cutoff valve is located. A temperature sensitive control valve 94 is also connected in conduit 129 in series with valve 96. The fuel admixture from preburner 125 is released into manifold 98 by a nozzle 92 which injects the fuel in the area of heating coil 90 to cause ignition thereof and consequent heating of the air within manifold 98. Simultaneously, switch 84 will de-energize heating coil 90 connected in parallel with relay solenoid 96A.

It will be appreciated from the foregoing that switches 84, 70, 36, and 76, in addition to starting switch 72, must all be actuated before relay solenoid 80A is energized, and switch 80B closed; so that energization of starter motor 82 is dependent upon the temperature in intake manifold 98 and in preburner 125 exceeding respective predetermined values and the pressures in fuel line 18 and air duct 38 exceeding respective predetermined values. In this way, useless cranking of the engine is prevented in that a proper supply of the hot fuel gas mixture, ready for self-ignition upon injection into the engine cylinders, has been rapidly developed before the engine starting motor 82 can be energized. The start-up operation of the engine is described in more detail hereinbelow.

Before turning to a more detailed consideration of the preburner itself, a further use of the gaseous fuel output thereof will be considered. As illustrated in FIG. 1, fuel conduit 129, described above, branches into an auxiliary conduit 129A which serves to conduct the fuel admixture to an output nozzle 110 forming part of a space heater system, generally designated 100. Energization of space heater system 100 is controlled by a double pole switch 76. When thrown, one pole of switch 76, denoted 76a, closes a first set of contacts which energize pumping motor 60, preburner heater 56, manifold heater 90, and cutoff valve relay solenoid 96A in the same manner as described for switch 74. A second pole of switch 76, denoted 76b, completes a circuit including a normally closed temperature-sensitive switch 120 connected in series with the parallel combination of a fan motor 112, a cutoff valve control solenoid 101A and a heating coil 108, and the terminals of power supply 78. Similarly to the manifold air heating system, solenoid 101A, when energized, causes opening of associated cutoff valve 101 and hence permitting the rate of flow through a temperature-sensitive control valve 102 to be varied in accordance with the temperature sensed by a sensor 104 associated with the valve 102, whereas heater coil 108 causes ignition of the gaseous fuel output of nozzle 110. Motor 112, when energized, drives fan 112 so that air is blown across the fins 116A of a heat exchanger 116 into a heat duct 119, thus insuring that the air is uncontaminated by products of combustion contained in other and isolated passages of the heat exchanger between the input 111 and exhaust 113. Temperature sensitive switch 120 includes a sensor 106 which causes opening of the switch contacts and subsequent de-energization of solenoid 101A, heating coil 108, and fan motor 112, when a preset maximum temperature is reached.

The operation of the space heater system can continue without operating the engine so long as sufficient electrical energy is made available, either through a storage battery, or connection to battery charger mains, or connection to a suitable electrical generator which may be mechanically driven by a gas burning turbine supplied with fuel from manifold 129 in a manner similar to that described above for the space heater itself. It will, of course, be appreciated that the space heater system 100 is merely exemplary of the types of auxiliary gas combustion devices or systems wherein the output from preburner 125 can be used as a prepared fuel. Switch 72 can be closed, if desirable, simultaneously with switch 74, but the starting motor 82 will not respond until the preburner 125 and the air preheater are both at acceptable starting temperatures. In an automobile, for example, switch 72 would be activated by the extreme right ignition key position, held only until engine starting is accomplished.

Turning now to a consideration of the preburner itself and referring particularly to FIG. 2, preburner 125 includes a body portion 130 and a cover plate 146. A first generally conical shaped separator baffle 142 cooperates with a second baffle 144 of dome of hemispherical shape to divide the preburner chamber, generally denoted 134, into a series of subchambers 141, 136, and 140, as illustrated. Baffle 142 includes a "neck" portion 124 having central opening which provides communication between subchambers 141 and 136. Similarly, baffle 144 includes lower openings 138 which provide communication between chambers 136 and 140. Further, a central upwardly extending portion 132 of the bottom wall of preburner 125 serves in providing an annular air space for intermixing of air and fuel injected into chamber 134. Control valves 20, 40, and 46 each preferably take the form shown for air control valve 46 shown in FIG. 2 and described hereinbelow. The nozzles controlled by these valves, such as nozzle 44 of FIG. 2, open into lower chamber 141, whereas the gaseous fuel admixture exists from upper chamber 140 through a suitable outlet 126A to conduit 126 described hereinabove. It will be appreciated that separators 142 and 144 provide major changes in both the direction and velocity of the fuel and air mixture from entry of the air and fuel through nozzles 24, 44, and 48 to the exit of the gaseous fuel through outlet 126A to conduit 126.

The cover plate 146 is provided with a heat and pressure resistant gasket 147 and is held firmly closed by bolts 148. The whole device, presenting external surfaces 146 and 130, is at the temperature of the gas mixture inside and hence, insulation, not shown, may be applied over these surfaces. Further, thermal isolation of the body 130 from an associated supporting member 133 may be accomplished by means of a thin walled member 131 extending up from support 133 to a point relatively high up on the surface of preburner body portion 130.

Considering briefly the operation of preburner 125, a spray of atomized liquid fuel must first be evaporated by heat, as from heating coil 56 used at least during initial operation, or from products of combustion which, of course, can only be developed after combustion with air has started. The air released through orifices 44 and 48 must also be available and locally heated as by coil 56 in order to take part in combustion, and after combustion starts the products of combustion must be continually intermixed with raw fuel and entering air to preheat both to the ignition point. Once started, these various parts of the total process operating within the preburner 125 provide a continuous output, of variable quantity, of relatively hot fuel-rich gas mixed with products of combustion.

In a typical case, perhaps 2% of the fuel, now in gas form, is required to be burned to preheat both the fuel and the air to the desired final temperature of the mixture supplied to manifold 126. Assuming approximately 60 volumes of air are involved in the complete combustion of 1 volume of gasoline vapor, the proportions within the preburner chamber 134 are approximately 120 parts air to 100 parts fuel vapor by volume. The intermixing of each into the other requires that the chamber provides a strong swirling action developed, in the present instance as described above, by the tangential nozzle flows into the annulus formed in subchamber 141 by the centrally projecting wall portion 132. The outlet from subchamber 141 is through the neck 124, thus requiring the rate of spin of the mass movement to increase as the effective radius of the chamber decreases along the direction of flow.

As stated hereinabove, the construction of the control valves 20, 40, and 46, and nozzles 24, 44, and 48, is preferably that shown for valve 46 and nozzle 48 of FIG. 2. Valve 46 basically comprises a sleeve 150 and a rod 46a movable therein. These elements being preferably fabricated of a nongalling heat resistant material such as stainless steel or another high nickel content alloy. Inlet conduit 39 communicates with an opening in valve sleeve 152, with movement of rod 46a controlling the passage of air between conduit 39 and a series of openings which form nozzle 48. Movement of rod 46a provides a shearing action at 152, the rod 46a including a portion of reduced cross section which, when aligned with the inlet opening in sleeve 150, permits air flow to nozzle 48.

Movement of rod 46a is controlled by pressure within the preburner 125 against a diaphragm 151 which is connected through a bellows member 153 to the body of preburner 125 as shown. A biasing spring 155 biases rod 46a into the normal, inoperative position thereof. It will be appreciated that a temperature-to-mechanical force transducer may be utilized for valve 20 and that a different pressure transducer may be used for the pressure controlled valves 40 and 46.

The tangential angle of emission of nozzle 48 discussed above is achieved by forming the nozzle openings in sleeve 152 as illustrated in FIG. 2A. A recess 135 formed in wall portion 130 of preburner 125 permits the spray to generally follow the curvature of the wall.

Figure 4:
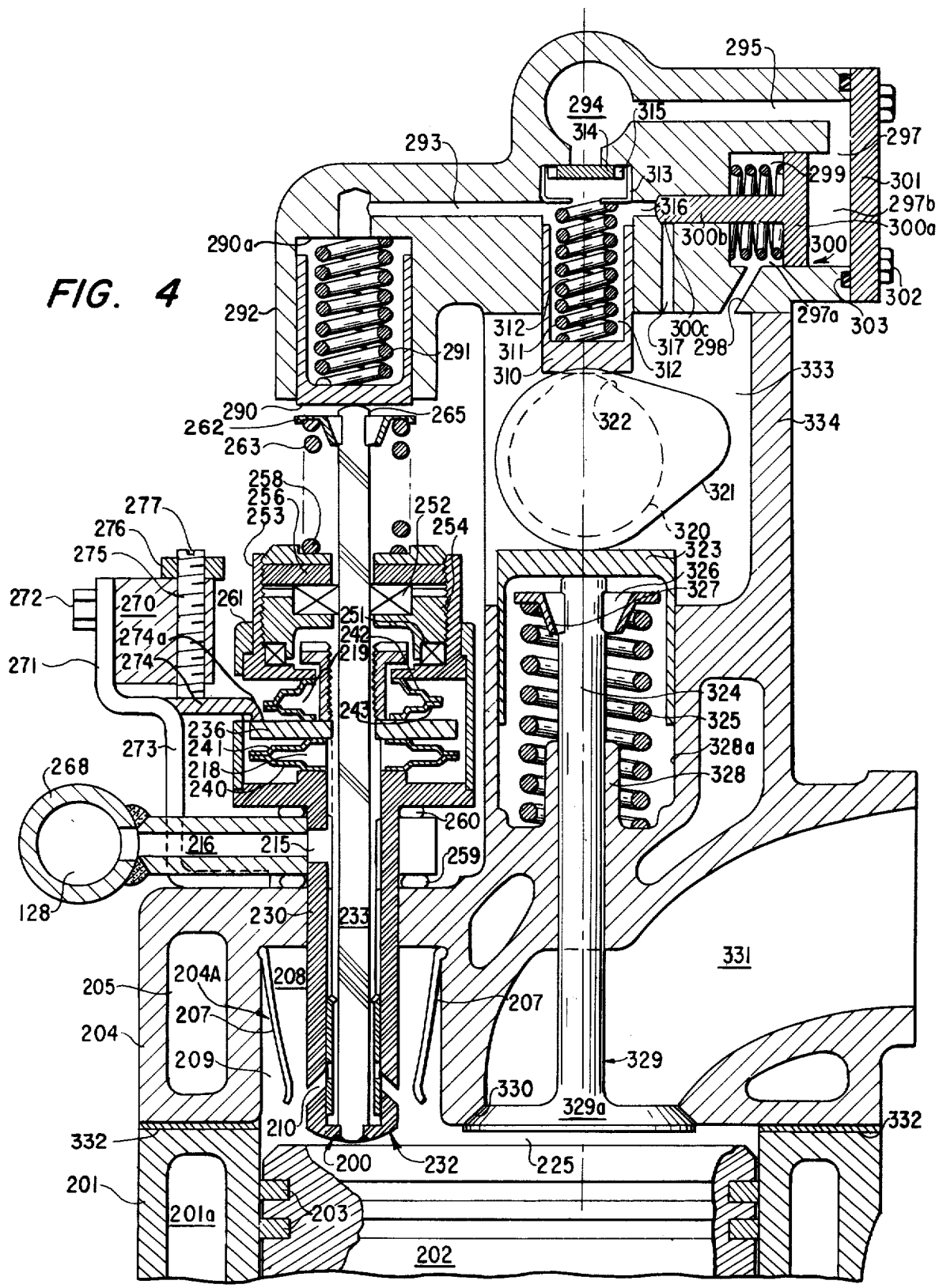
FIG. 4 is a sectional view taken generally along line IV—IV of FIG. 3.
Figure 5:
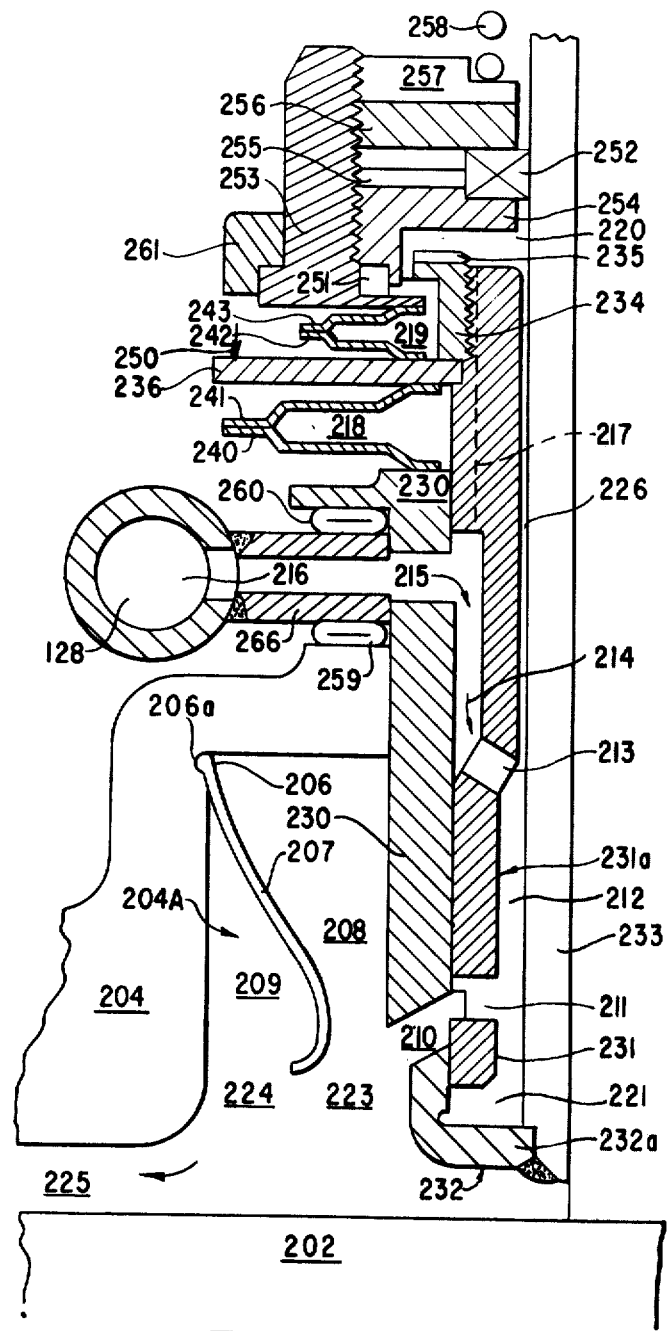
FIG. 5, drawn to an enlarged scale, illustrates a detail of FIG. 4.

Referring again to FIG. 1 and turning now to a consideration of the subsystems by which the hot gas fuel flow in manifold 128 is injected into the engine cylinders, manifold 128 is connected to the cylinder heads of each of the cylinders, one of which, denoted 204, is shown in FIG. 1. Although the details of the valve controls and the hydraulic mechanical operators therefor are shown in FIGS. 4 and 5, to provide a general orientation reference is made first to FIG. 1 wherein is illustrated the principal subsystems involved.

The principal functional subsystems illustrated in FIG. 1 comprise a timing and fuel admission valve 232, a metering valve 231; an external operating mechanism for controlling movement of metering valve 231 for fuel control purposes (not identified by number, but described hereinbelow); a mechanical and hydraulic subsystem for operating timing valve 232 from an engine driven cam 322 mounted on a camshaft 320; a hydraulic subsystem associated with a valve member 300 which serves to vary the time of opening of valve 232 as a function of the speed of crankshaft rotation of the engine; and a hydraulic subsystem associated with the engine driven devices which serves to supply a controlled pressure in the hydraulic circuits associated with valve member 300.

Considering these subsystems generally, it will be appreciated in a piston type engine the release of fuel into the engine combustion space above the piston is performed intermittently in timed relation to camshaft operated inlet and exhaust valves and crankshaft operated pistons. The quantity of fuel permitted to enter the combustion space is also limited for each cycle for combustion purposes. In the case of direct injection of liquid fuel in conventional diesel engines, a measured amount of liquid fuel is isolated from the fuel supply line at each cycle and subsequently injected into the combustion space, thus satisfying the stated requirements. However, with gaseous fuel as contemplated in accordance with the invention, preliminary isolation from the pressurized supply of a metered amount of fuel for each cycle also requires that a specific isolated quantity of fuel be completely transferred into the combustion chamber under considerable pressure, even to the last part.

In this case, complete injection, therefore, requires complete displacement transfer of a gas, in a manner similar to the conventional transfer of liquid fuel against any developed counterpressure of the liquid fuel. It is noted that although the system described hereinbelow is preferred, a piston-operated transfer device, similar to ordinary piston or plunger operated fuel pumps, can be used as an alternate means of fuel injection of the gaseous fuel produced by the preburner 125.

In accordance with the embodiment shown in FIG. 1, a pressurized source of gaseous fuel supply, as from preburner 125, is utilized having a specific rate of flow per unit time as determined by a variable orifice such as metering valve 231 so as to limit the total quantity flow per cycle of operation by limiting the time during which a control (closure) valve is open in that cycle. Consequently, by selecting a flow rate by suitable positioning of control valve 231 and limiting the time period during which flow is permitted so that the maximum total quantity of flow for one cycle will not exceed a predetermined limit, the fuel/air ratio is controlled for each cycle of operation. In accordance with the embodiment of FIG. 1, control of the time during which fuel flow takes place is accomplished by keeping the time during which timing valve 232 is open substantially constant, without variations due to speed of rotation of the engine and of the camshaft 320.

In accordance with this mode of operation, an arbitrary maximum speed is selected for which fuel flow rates from the preburner 125 can be allowed for the time period during which cam 322 holds valve 232 open without allowing excessive fuel to enter the engine combustion cylinder space. At any greater speed, less than this maximum quantity of fuel will enter the engine combustion space per cycle due to the reduced time period of the faster acting cam described below. At any lesser speed, however, excessive fuel flow results from the longer cam dwell time unless additional preventive steps are taken. For this purpose, as described hereinafter, a hydraulic motion transmission device is interposed between cam 322 and valve 232 so that a suitable reduction in valve 232 motion (both opening dimensions and opening time dwell) can be made as the speed decreases.

Having described the general operation of the subsystem of FIG. 1, reference is made to FIG. 1 and more particularly FIGS. 4 and 5, for a more complete description of these subsystems.

As stated, the hot gas fuel mixture from the preburner 125 flows into manifold 128 through a connecting passage 216 in an inlet member 266, to the individual cylinders, the mixture then flowing, for the examplary cylinder under consideration, into the valve assembly 200 which includes valves 231 and 232 mentioned above. Valve assembly 200 is mounted in cylinder head 204, the cylinder also including a cylinder block 201 including water spaces 201a therein, and a piston 202 movable in cylinder block 201 and including associated piston rings 203 in accordance with conventional cylinder construction. Cylinder head 204 also includes water passages 205, and a cylinder head gasket 332 is located between cylinder head 204 and cylinder block 201.

Referring particularly to FIG. 5, the passage in inlet member 266 communicates with an opening 215 in the valve housing 230 of valve assembly 200. Valve 231 comprises an elongate operator 231a which is guided within a bore in valve housing 230 by the outer diameter thereof at both its lower end and its upper end, these areas being separated by a passage 214, formed by relieving the bearing surface of valve 231, and in communication with inlet opening 215. A passage 213 in valve operator member 231a provides communication between upper passage 214 and a lower, central passage 212. This lower passage 212 communicates with an outlet passage 211 formed in a lower portion of member 231a.

Valve 232 includes a central movable valve stem 233 and a valve head 232a fixed to the lower extremity of stem 233. As illustrated, an upwardly extending portion of valve head 232a cooperates with a valve seat formed by a lower surface of valve housing 230 to form a variable orifice or passage 210 of generally annular shape. The opening provided by orifice 210 is variable between no opening and the full height of communicating passage 210. The valve stem 233 does not contact the inner surface of valve 231, although the valve head 232a is supported radially and guided by the outer diameter of valve member 231a, thus assuring the concentric positioning of valve head 232a relative to its valve seat on the lower end of housing 230 when passage annulus 210 is closed. In an alternative embodiment, valve stem 233 could be guided by the valve 231 below valve port 211, by decreasing the internal diameter of valve member 231 in this region so as to provide a positive, albeit very small, clearance between valve member 231a and the inner surface of valve head 232a.

As shown in FIG. 4, the upper end 265 of valve stem 233 contacts a piston 290, a spring 291 holding piston 290 in contact with stem 233 at all times. Stem 233 is supported adjacent the upper end thereof by a seal 252 which seals the passages thereof. Seal 252 is supported by threaded nuts 254 and 256 having wrenching slots 255 and 257, respectively. A coil spring 258 positioned between the upper surface of nut 256 and a spring retainer 262 secured to the upper end of stem 233 serves to support valve member 232a as well as to bias stem 233 into engagement with piston 290. It will be appreciated that additional members for locking, support or sealing may be added as necessary or desirable.

Figure 6:
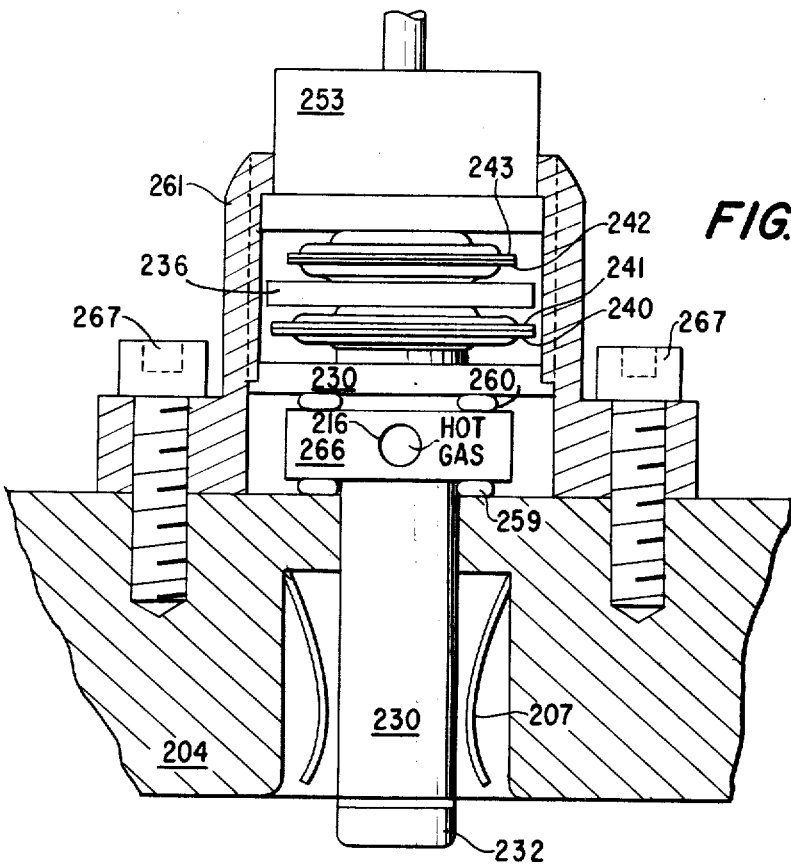
FIG. 6 is a sectional view taken generally along line VI—VI of FIG. 3.

A further seal 251 acts to seal against leakage along the threads of an upper valve housing 253. A portion of the valve assembly enclosure 261 (See also FIG. 4) acts through suitable threads or bolting members (not shown) to maintain upper valve housing 253 in fixed relationship to lower valve housing 230. As shown in FIG. 6, enclosure 261 also provides an appropriate "tie-down" onto cylinder head casting 204, whereby gaskets 259 and 260 are compressed to seal the passages in inlet member or block 266 and valve housing 230 against external leakage, and valve housing 230 is retained in place. Lower flanges on enclosure 261 are bolted to cylinder head 204 by bolts 267 to provide this "tie-down."

Slots 217 in the outer surface of valve member 231a provide communication between passages 215 and 214 and internal gas spaces 218 and 219. Similarly, the end surface of a nut 234 screwed onto an upper portion of valve member 231a is relieved to permit gas flow into spaces 220 and 219. An upper space 220 beneath nut 254 is also open to gas flow in 214, a path being provided through passages 213 and 212 and clearance space 226 between the internal surface of valve member 231a and the outer surface of valve stem 233. Annular spaces 218 and 219 referred to above are respectively enclosed by corresponding flexible bellows formed by integral or welded bellows elements 240, 241 and 242, 243. Bellows elements 240 and 241 are respectively welded or otherwise secured to an upper surface of valve housing 230 and a lower surface of an annular disc 236 in a leak proof manner whereas bellows elements 242 and 243 are respectively similarly secured to an upper surface of disc 236 and a lower surface of upper housing 253. As illustrated, annular disc 236 is captive between the upper biassing surface of a recess of valve member 231a and the lower abutting surface of nut 234, and at the same time flexibly retained between bellows elements 240 and 241 therebelow and 242 and 243 thereabove. Because of this construction, a force to be applied externally to disc 236, as at 250, can cause appropriate motion of valve 231 without permitting gas leakage through the flexible connections. AS shown, the internal area of space 218 is greater than that of space 219 so that the same gas pressure in each will develop a net effective thrust in an upward direction on disc 236, the other extremities of the bellows, secured to lower housing 230 and upper housing 253 respectively, being fixed in position.

The two bellows-formed spaces 218 and 219 provide, thus, a direct acting counter force to forces which may be applied at 250 for control of valve 231. This pneumatic force differential precludes the need for additional spring members to act against the force applied at 250, and also performs the very important function of closing the orifice provided by passage 211 in valve member 231a by retracting the passage 211 to a position above the orifice opening 210 formed by valve head 232a when lifted from its seat on housing 230. Thus in the absence of a gas valve opening force at 250, the pressurized valve 231 is self-closing, a necessary safety feature.

As can perhaps best be seen in FIG. 4, valves 231 and 232 open into a recess 204A in cylinder head 204 above piston 202. Recess 204A, which surrounds the valve assembly 200, is part of the clearance volume above the piston 202 when the latter is at the top center position of its stroke. In accordance with a further feature of the invention this recess is designed to contain the greatest possible percentage of the total clearance volume, which, of course, also includes a space 225 between the piston 202 and the cylinder head 204. Further, the recess 204A is designed such that to the greatest extent possible, a maximum portion of the volume thereof is located above the path of flow of gas issuing from orifice 210 of the fuel valve assembly 200. In accordance with a further important feature of this invention, the volume of compressed air contained in the portion of recess 204A above the fuel flow path is made to flow through the mix with the gaseous fuel as the fuel is released from the orifice 210 and the piston 202 is moving down from the top center position thereof on the power stroke.

To promote turbulence within recess 204A and to create a two stage mixing of the air compressed in recess 204A, recess 204A is subdivided into first and second annular chambers 209 and 208 by a shaped separator 207 one end of which is retained in a recess 206 in the wall of cylinder head 204 by a suitable expanding locking device 206a. Separator 207 is preferably shaped such that chamber 208 has a volume greater than that of chamber 209 and such that the connecting passage 223 between chamber 208 and the clearance volume above piston 202 is in the form of a venturi-shaped contracting-expanding annulus adjacent inlet orifice 210. Air is, of course, compressed within chambers 208 annd 209 during the upstroke of piston 202. The venturi shape of passage 223 serves in the creation of a high velocity cross flow of air in the area of orifice 210 during the downstroke of piston 202 and hence promotes mixing of this air with gas issuing from orifice 210. The turbulent mixture so produced moves from the area of the valve assembly 200 as to further mix with compressed air flowing from chamber 209 through a passage 224, some further degree of turbulence being produced by the shape of 207 in this region as well. As piston 202 continues to move down a relatively large volume, of course, created as the volume of space 225 enlarges in an axial direction so that the combined flow through air passages 223 and 224 and gas orifice 210 moves rapidly to fill this expanding volume.

Because the temperatures of both the gaseous fuel released through orifice 210 and the compressed air in chambers 208 and 209 are above that required for autoignition, the fuel starts to burn immediately upon issuing form orifice 210, subject only to the so-called chemical delay portion of a total ignition delay period. It is important to note that, as discussed above, an additional physical delay period common to Diesel type engines has been avoided in accordance with the present invention by completing the atomization and vaporizing of the liquid fuel in the preburner 125. From the foregoing, it will be appreciated that the accumulation of a fuel-rich mass at annulus region 223 is prevented by the immediate cross flow of air from chamber 208 and the turbulent flow from chamber 209 in the general direction of expanding region 225, with resulting turbulent mixing and burning of the issuing fuel gas stream from orifice 210. It is desirable that a relatively small amount of gaseous fuel be admitted before or at the top center position of piston 202 for the purpose of raising the cylinder pressure somewhat above the maximum pressure of air compression produced by the piston 202 itself, as well as for permitting the short period of chemical delay to take place before the expansion stroke begins. This initial emission of gaseous fuel occurs when valve head 232a first lifts off the seat therefor formed by valve housing 230 so that orifice 210 is of a relatively narrow width with a resulting maximum emission velocity and consequent turbulence in the region of passage 224, the release of the gas initiating a flow path in the mass of air, to be followed by the further flows as previously described.

Separator 207 is preferably formed of a heat and oxidation resistant material such as austenitic stainless steel or other high nickel alloy. Because of the shape of separator 207 and the position thereof relative to the path of the burning fuel issuing from orifice 210, the lower end of separator 207 is heated by the zone in which combustion takes place, and hence by retaining, from cycle to cycle, a part of the higher-than-average temperature of this zone, the separator 207 is available to assist in the rapid ignition of the gaseous fuel from orifice 210 as well as in the complete combustion of this fuel.

Figure 7:
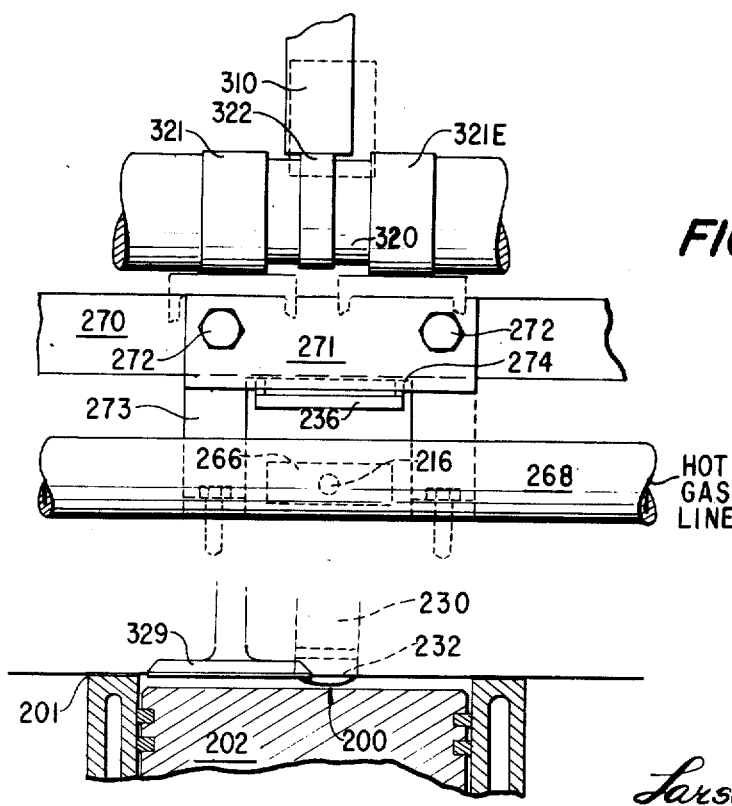
FIG. 7, is a side view of valve assembly of FIG. 3 taken in the direction of the arrowheads on line VII—VII of FIG. 3.

The air supplied to clearance space 225 and recess 204A is controlled by an inlet valve 329 (see FIG. 4 in particular). Valve 329 is located in an intake passage 331 which communicates with air intake manifold 98, described above and shown in FIG. 1. Valve 329 includes a valve head 329a and an integral valve stem 324, valve head 329a, when closed, seating on a valve seat 330 formed in the cylinder head casting 204. A valve spring 325 cooperates with spring retainer members 326 and 327 secured to the upper end of valve stem 324 to bias valve stem 324 against a movable cam follower 323 located in a bore 328a in cylinder head casting 204. Cam follower 323 is driven by a cam 321 mounted on a camshaft 320 and, if desired, can be provided with conventional adjustment device (not shown) as it contacts surface of cam 321. A valve guide 328 extends into bore 328a and includes a central opening which guides the movement of valve stem 324. An exhaust cam 321E (see FIG. 7) cooperates with an exhaust valve 340 (indicated schematically in FIG. 3) in a similar manner.

As mentioned hereinabove, movement of valve stem 233 of valve 232 is controlled by a piston 290 in contact therewith. Piston 290 is a part of a hydraulic control system best seen in FIGS. 4 and 5, movement of piston 290 being controlled by a fuel control cam 322 located on cam shaft 320 (see also FIG. 7). As shown in FIG. 4, piston 290 is mounted in a bore or chamber 290a in a valve cover casting 292. A riser 334 integral with cylinder head casting 204 supports valve cover casting 292, casting 292 being bolted to cylinder head 204 which is, in turn, bolted to cylinder block 201. A hydraulic cover plate 301 is bolted by bolts 302 to casting 292, a seal 303 providing the necessary hydraulic sealing.

Cam 322 located on cam shaft 320 drives a piston 310 received in a further bore or chamber 312 in valve cover casting 292 (see FIG. 4). A spring 311 positioned within a bore in piston 310 biases piston 310 outwardly, spring 310 also bearing against an inwardly extending flange of a spring retainer member 313. Chamber 312 communicates through a passage 293 with the piston chamber 290a for piston 290. A disc valve 314 positioned centrally of and within a valve seat 315 controls communication between chamber 312 and an oil line 294.

Oil line 294 is connected through a passage 295 in casting 292 to a further chamber 297 formed in casting 292. As illustrated, chamber 297 is divided into subchambers 297a and 297b by the annular head portion 300a of a valve 300 and passage 295 communicates with a subchamber 297b. A spring 299 located within subchamber 297a biases valve 300 outwardly from the endwall of chamber 297 in a direction such as to decrease the size of chamber 297b. A bleed or dump passage 298 (see FIG. 4) connects chamber 297b to a space 333 in which cam shaft 320 is located for extreme pressures which force valve 300 to the extreme lefthand position thereof. The valve 300 also includes a stem portion 300b having a tapered or pointed end 300c which controls the flow of oil from piston chamber 312 through an outlet passage 316 to a further drain or dump passage 317.

As is indicated schematically in FIG. 1, the pressure and flow in oil line 294, which is common to the multiple cylinders of the engine, is controlled by a metering oil pump 353 and a pressure variation control valve system 355. Oil pump 353 is supplied either directly from the engine oil sump, denoted 350, by suction or, in accordance with a preferred embodiment, under initial pressure from a conventional lubricating oil pump 351. Pressure variation control system 355 includes a movable valve operator 357. Operator 357 includes an elongate tapered operator member 357a which controls the size of a restricted passage between a first chamber 354 which communicates with pump 353 and a dump or bleed outlet 362. Valve member 357a is formed integrally with and moves with a piston head 357b located in a chamber 361. A spring 359 biases piston head 357b in direction such as to decrease the size of the portion of chamber 361 in communication with oil line 294, as illustrated. A further passage 360 provides direct connection between chamber 354 and oil line 294.

Pump 353 normally delivers a volume of oil at a rate of flow which is proportional to the speed of rotation of the engine, except for slight leakage losses which may be neglected. Moreover, the rate of flow will still increase with an increase in speed of rotation, although not in precisely the same ratio, where the output of the pump 353 flows through a restrictive orifice which creates a back pressure in the delivery line from the pump to the orifice. Thus, the orifice formed between the tapered valve operator member 357a of valve 357 and a surrounding restriction 356 acts to increase the pressure in connecting passage or chamber 354. A comparatively small rate of oil flow from pump 353 will take place through passage 360 into passage 294 for control by valve 300 and subsequent release to the oil sump 333 through drain 317, the major rate of flow from pump 353 being through the annular orifice formed by valve member 357a and restriction 356 and thence into the oil sump through drain passage 362.

As stated, the movement of member 357a in restriction 356 with an increase in the rate of flow from pump 353 is to increase the pressure in passage 354, as well as in passages 360, 361 and 294, substantially as the rate of flow from pump 353 increases with an increase in speed of rotation of the engine. To explain, it is first assumed that for a given engine speed, valve member 357a is positioned in the orifice determined by restriction 356 as shown in FIG. 1. In this position, the pressure within passage or chamber 354, acting on the net sectional area of valve member 357a which lies in the plane determined by restriction 356, will produce a force tending to urge member 357a toward the right as shown in FIG. 1. In order to stabilize the position of valve member as originally assumed, this force is opposed by an equal and opposite force which is primarily that produced by the difference between pressure in sub-chamber 361 acting over the area of piston head 357b, and the force of spring 359 acting in opposition. If this equilibrium condition is now upset by an increase in the speed of rotation of the engine, which, as stated, causes an approximately proportional increase in the rate of flow from pump 353, the pressure will increase in chamber 354 and tend to urge valve member 357a to move to the right. However, at the same time the pressure in chamber 361 similarly increases, and since the area of piston 357b is always greater than the net area of valve member 357a within the plane of the restriction 356, the net effect is to urge the valve member 357a to the left rather than the right, again as viewed in FIG. 1. Such movement to the left will increase the force exerted by spring 359 due to the further compression thereof and also will, because of the tapered contour, present a reduced net area between valve member 357a and restriction 356 within the plane of restriction 356. The final result is that a new equilibrium position is established for valve member 357a slightly to the left of the initial position thereof. Valve 357a is shaped such that the net area between valve 357a and restriction 356 for this new position is reduced to a new valve which allows both the development of the increased pressure in passages and lines 354, 360, 361 and 294 and the simultaneous increase in flow through the orifice at restriction 356 which was postulated by the speed increase of the engine. Hence, by tapering valve 357a in the direction shown the required variation of pressure in oil line 294 as a function of speed of engine rotation can be provided. The pressure relationship so produced is used at valve member 300 for control of the fuel valve mechanism for each cylinder as described hereinbelow.

The pressure in oil line 294 is, as described hereinabove, variable and controllable. Assuming, however, that this pressure is a maximum and corresponds to a maximum speed of the engine and that valve member 300 is moved by this pressure to practically close off passage 316, then with valve 314 closed the hydraulic circuit between piston 310 and piston 290 will be practically closed so that motion transmitted to piston 310 by cam 322 will directly cause movement of piston 290 and hence of valve stem 233 and associated valve head 232a, thus opening passage 210 to the maximum dimension thereof. As the cam moves from the position of greatest left shown in FIG. 4, the piston 310 will follow the cam surface to the lower level of the base circle of cam 320, being forced to do so by biasing spring 311. Simultaneously, the thrust exerted by spring 258 through valve stem 233 against piston 290 will overpower the force of spring 291, and hence cause a flow of the hydraulic fluid, which, in this instance, is taken to be oil, through passage 293 into chamber 312. If because of leakage there is insufficient oil in this circuit to provide filling thereof, then oil line 294 will refill the local circuit through disc valve 314 which is of the type common to hydraulic valve lifter devices operated by camshaft.

As explained hereinabove, any reduction is speed of the engine reduces the pressure in oil line 294. This reduction in the pressure in oil line 294, in turn, reduces the hydraulic force on piston and piston rod 300a causes spring 299 to move the piston rod 300a so that the outlet passage 316 is made relatively more open, thereby allowing relatively more hydraulic fluid to escape through passage 316 and drain 317 into the engine sump connecting passages. Thus, when piston 310 is again moved the same repetitive distance by cam 322, some oil escapes through passage 316 and an amount of oil less than the previous full volume of oil is transferred to chamber 290a causing movement of piston 290. Thus either, or both, the total lift of valve 232 or the period of opening thereof, will be reduced. The product of this time integral of flow through valves 231 and 232 in combination, and the rate of flow with valve 232 fully open is the gross quantity of fuel which is passed through the valving for a single cycle.

Figure 8:
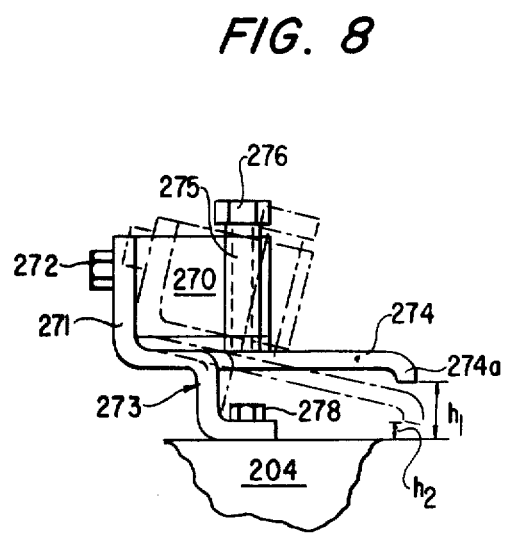
FIG. 8 illustrates a detail of FIG. 4 and shows torsion bar actuated device for operating fuel metering valves.

Referring particularly to FIGS. 4 and 8, there is shown a "pivotless" torsion bar 270 which produces the controlled force at point 250 on valve disc 236 as discussed above. Torsion bar 270 is supported at each cylinder by a bracket support member 273, the relative positions of bar 270 and support 273 being adjustable through vertical adjustment of the position of a bolt 272 which extends through an oversized hole or slot in an upstanding flange 271 of support 273 and horizontal adjustment of the position of a further bolt 278 within an oversized hole in a base flange of support 273. The bracket support 273 includes an outwardly extending horizontal arm 274 having first and second tip ends or fingers 274a (see FIG. 3) which contact disc 236 of the fuel control valve assembly at two diametrically opposite points, one of which is indicated at 250 in FIG. 5. The position of arm 274 relative to torsion bar 270 can be adjusted by a lock nut 276 and an associated screw 275 which extends through torsion bar 270 as illustrated in FIGS. 4 and 8. In this manner arm 274 can be made to bear on disc 236 so as to produce any desired axial positioning of the valve 231 relative to the lower end of housing 230. Thus, the fuel valves for each of the cylinders can be adjusted to produce the same response and provide fuel flow rates at the sensitive idling speed of the engine.

Figure 9A:
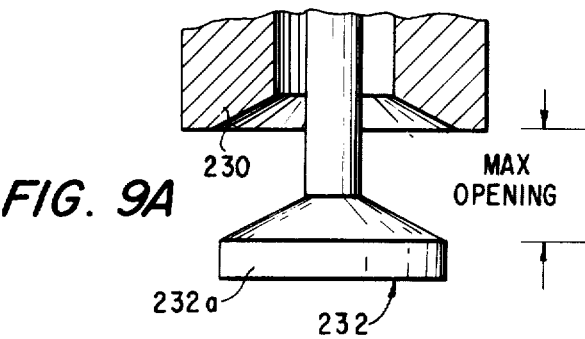
FIGS. 9A, 9B, 10B, 11A, 11B and 12A, 12B are diagrams used to illustrate the operations of the timing and metering valves of FIG. 4.
Figure 9B:
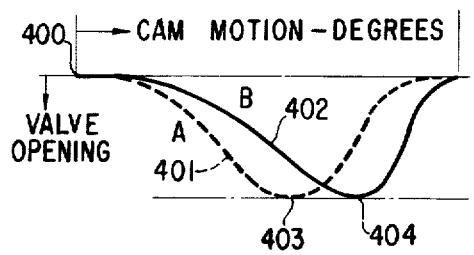

Referring now to FIGS. 9A and 9B, 10A and 10B, and 11A and 11B, and 12A and 12B the operation of valves 231 and 232 will be considered in more detail, particularly with regard to the movements of the valves 231 and 232 in relation to the camshaft angle during which valve 232 is open and the opening time for the valves at different engine speeds. Referring to FIG. 9B, the valve opening and closing movements with respect to time of a conventional poppet valve cam are represented by dashed curve 401. For comparison purposes the same movements of slower opening and faster closing valve cam in accordance with the present invention, are represented by solid curve 402 on the same open time base. The relatively slow opening illustrated by curve 402 is provided to restrict the initial rate of flow of fuel through the relatively small orifice 210 formed as valve 232 begins the opening movement thereof away from the valve seat formed by valve body 230. A rapid closure of the valve 232 is provided to cut off the fuel flow sharply as the piston is gaining velocity during downward travel thereof on the power stroke. It will also be noted that, as shown in FIG. 9B, curves 401 and 402 both start at point 400 but that curve 401 peaks at a point 403 which is in advance of the point 404 at which curve 402 peaks, peak 402 representing the maximum opening of valve 232 (see the schematic showing at FIG. 9A).

Figure 10A:
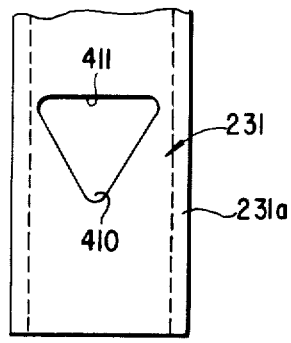
Figure 10B:
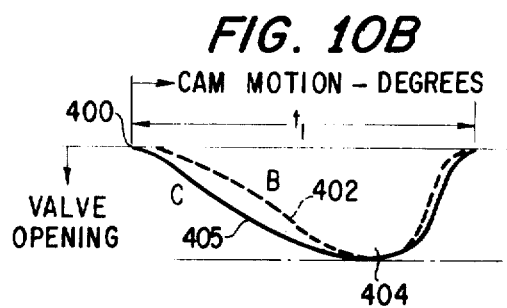

Referring to FIG. 10A, the preferred shape of port or valve opening 211 of valve 231 is shown. It will be appreciated that a series of such ports may be located around the circumference of valve body 231a to provide a general annular release pattern although for purposes of simplicity only a single port will be considered. FIG. 10B, which repeats, in dashed lines, curve 402 of FIG. 9B illustrating the opening and closing movements of valve 232, shows how the shape of the port opening 211 in valve 231, acting in conjunction with fixed valve seat end of valve body 230 and moving valve head 232, can influence the effective valve opening provided by both valves 232 and 231. Curve 405 illustrates the percentage of the port area exposed by timing valve 232 for the full throttle position of metering valve 231, the time $t_1$ representing the period of open time. As will be appreciated from a consideration of FIG. 9B, with port 211 positioned in the full open position through maximum depression of disc 236, the valve opening provided by valve 231 is equal to the full axial height of port 211. As shown in FIG. 10A, port 211 is of inverted triangular shape so that the broader width, denoted 411, is uncovered first as valve head 232a moves away from the seat provided by valve body 230. This means that a maximum possible open area of port 211 is uncovered for unit of distance travelled during the initial movement by valve 232 as compared with the minimum additional area uncovered for the same unit distance of travel of valve 232 at the peak 404 of its valve lift, that is, in the region denoted 410. Thus, the inverted triangular shape of port(s) 211, with widened portion 411 uppermost and uncovered first by valve 232, allows for a greater total fuel flow per cycle than will be provided with a port rectangular in shape and hence providing a constant incremental area uncovered gy valve 232 per unit distance of travel. This condition of maximum total flow provided by the interaction of valves 231 and 232 is necessary at the highest speeds of operation for maximum valve efficiency.

Figure 11A:
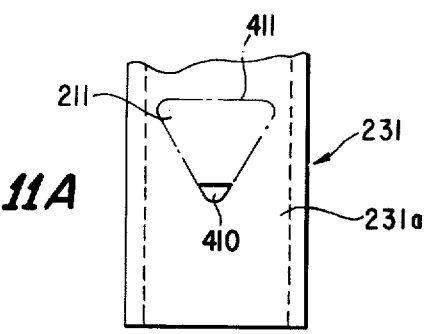
Figure 11B:
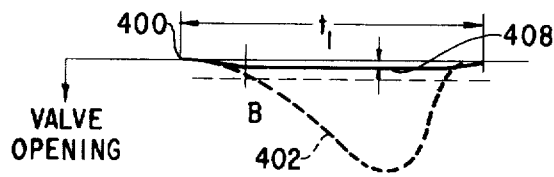

FIG. 11B illustrates the manner in which the minimum open position of valve 231 acts to further reduce the minimum net orifice area provided by valve 232 acting alone. The curves shown in FIG. 11B are, like those in FIG. 10B, representative of maximum speed conditions, where the action of valve member 300 in FIG. 1 has allowed piston 290 to impart substantially the full proportionate movement of piston 310 to valve 232, largely unreduced by leakage at valve member 300. Thus the valve open period $t_1$, and the valve open degrees of rotation, are the same in FIGS. 10B and 11B. As shown in FIG. 11A, the position of valve 231 is now above that illustrated in FIG. 10A, so that only the lower tip area of port 211, denoted 410 extends below the seat provided by housing 230 will be uncovered by valve head 232a during the movement thereof away from its seat. Hence, the port area 410 so uncovered is substantially smaller than the port area 411 uncovered by the same initial opening movement of valve head 232a for the position of valve 231 shown in FIG. 10A. This tends to decrease the sensitivity of control at minimum valve openings by reducing the ratio of flow per unit valve opening.

Figure 12A:
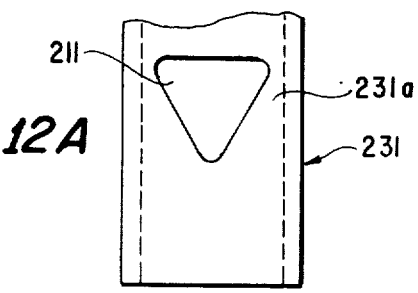
Figure 12B:
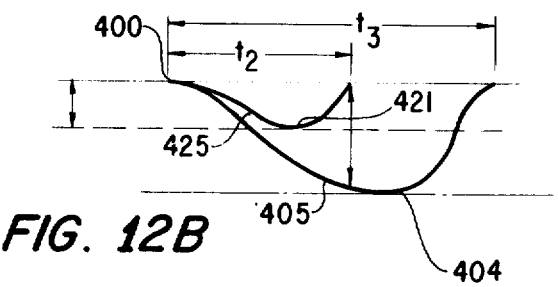

Referring to FIGS. 12A and 12B, valve operation under the conditions of (1) minimum speed of rotation of the engine, (in contrast to maximum speed as in FIGS. 10B and 11B, and (2) valve 231 in the full open position, (as in FIG. 10A), will be considered. If it is assumed, for example, that the engine speed is reduced to an idling speed which is one-tenth of the maximum speed, then the time period $t_3$ of the curve 405 in FIG. 12B, which represents full open valve operation, is approximately 10 times as long as time period $t_1$ of FIG. 10B. Without other restrictions this operating condition would allow approximately ten times the maximum allowable fuel to be injected into each cylinder at each cycle, which is an obviously intolerable arrangement.

In accordance with the present invention, this situation is preferably remedied by reducing the time of opening of valve 232, or the maximum lift of valve 232 or a combination of both, rather than complicate the operation of valve 231. A hydraulic system, discussed in a general way previously, will be considered hereinbelow although according to a further aspect of the invention, valve 232, or an equivalent valve in the flow path of the gaseous fuel, can be varied insofar as duration of opening, and height of lift, by an electronic control system (not shown) which is responsive, to factors such as engine speed and throttle setting as represented by valve 231. Electronic systems for fuel injection metering and control which varying the time of opening of the injection valve are conventional and one form of such a system is that presently utilized on Volkswagen automobiles. Although the Volkswagen injection system is a low pressure, liquid injection system and provides injection before compression rather than after compression, the electronic control system thereof can be readily adapted to control the operation of valve 232 so as to reduce the time of opening thereof as required, in this case to a time which is one-tenth of the time $t_3$. It will be understood that alternate systems can be utilized and that other electric, pneumatic, hydraulic or fluidic control systems can be used to accomplish the same purpose. Considering the hydraulic control system mentioned above, valve member 300, seen best in FIGS. 1 and 4, is retracted due to lowered pressure in line 294 and hence sufficient oil flows through orifice or passage 316 and drain passage 317 to the oil sump 333 to prevent in a large part the movement of piston 310 from being transmitted to piston 290 and hence to valve 232. Curve 405 of FIG. 12B illustrates the opening and closing movements of valve 232 with valve member 300 substantially closed whereas, curve 425 of FIG. 12B illustrates the same movements of valve 232 with valve member 300 substantially fully open. The differences between curves 425 and 405 are due to the bleeding action of valve member 300 during each cycle of operation of the hydraulic valve operating system. By making the area between curve 425 and the upper datum line substantially one-tenth of the corresponding area under curve 405 on a time base equal to time $t_3$, the approximate conditions for a uniform maximum fuel to air ratio at all speeds are secured. The system of the invention permits sufficient control of all variables to establish this uniform ratio.

Considering the operation of the system described hereinabove and, in particular, the "start-up" procedures, double pole switch 74 is first closed and momentary contact switch 72 is held closed until the moment some little time later when the starting motor 82 is automatically energized and begins turning over the engine. During the time before energization of motor 82, the following sequences are completed. Firstly, all switches are in the positions shown in FIG. 1, apart from switches 74 and 72 which are now closed. Both solenoid 96A and heating coil 90 are energized through switch 84, the temperature within manifold 98 as sensed by temperature sensor 86, at this time, of course, being less than that required to actuate switch 84. Thus, with switch 84 closed, solenoid 96A operates solenoid valve 96 to open the gaseous fuel line 129 to flow control valve 94 which is at this time held wide open by the fact of the low temperature in manifold 98 sensed by regulator 88. The manifold air heating subsystem is thus ready to receive and ignite combustible fuel gas delivered by fuel line 129 when this gas is produced by preburner 125.

Further, with switch 74 closed, both the burner heater 56 and the pumping motor 60 wil be energized, switch 70 and switches 16 and 36 being closed. Switch 70 is, as described hereinabove, held closed so long as temperature within preburner 125 sensed by sensor 54 is below working temperature for the preburner. Switches 16 and 36 are connected in parallel and are each normally closed unless opened by pressure sensor 14 (for switch 16) or the pressure sensor 34 (for switch 36), respectively. Hence motor 60 is energized as long as the pressure in each of manifolds 18 and 38 has exceeded a maximum allowable pressure. It is noted that the individual switches 16 and 36 may also include further over-pressure sensors (not shown) for preventing the pressures in the respective manifolds 18 and 38 from exceeding further dangerous levels.

Motor 60, when energized, drives air compressor 32 and fuel pump 12 through shafts 62 and 64, respectively. As discussed above, fuel pump 12 draws either liquid fuel or gaseous fuel from storage tank 10, pressurizing the fuel as necessary if not stored under engine working pressures, or metering and restricting the free flow thereof, if a high pressurized gas fuel.

Air compressor 32 draws air from atmosphere through intake 30 which represents either an air cleaner and silencer or an inlet from an air line accepting first stage compressed air from the compression stroke of the engine before fuel injection occurs. Pressure now builds up in manifolds 18 and 38 and fuel and air flow through flow control valves 20 and 40, respectively, to respective nozzles 24 and 44. As described hereinabove, valves 20 and 40 are simultaneously controlled by pressure sensor 50 in such a manner as to maintain a substantially constant ratio of fuel flow to air flow under all conditions in which the pressure sensor 50 acts to control the total flow in each line. Fuel from nozzle 24 impinges on heating coil 56 and starts to burn in the presence of air from nozzle 44 which has started a forceful circular mixing pattern with the fuel. Also, as discussed above, the air supplied through nozzle 44 is not sufficient to supply by combustion the total heat requirements for vaporizing the liquid fuel and raising the temperature of the fuel and the air to the present working temperatures determined for the preburner 125. For this purpose, additional air is supplied through branch manifold 39, temperature controlled valve 46, and nozzle 48. Temperature regulator 52 controls valve 46 so as to release sufficient extra air for combustion purposes to maintain, within predetermined limits, the temperature of the swirling mixture of hot gas and hot air within preburner 125. At the same time, both fuel and air are continually released in proportioned quantities through valves 20 and 40, respectively, until the pressure in preburner 125 increases to a value which causes sensor 50 to reduce, or terminate, the flow in both lines simultaneously.

It will be appreciated that some initial flow through line 129 will occur at less than engine operating pressures, the lower pressurized fuel mixture issuing through nozzle 92 in the intake manifold 98 to be ignited by heater 90. The burning of this mixture in manifold 98 will raise the temperature of the non-moving air in the manifold to the "cut-off" temperature, as determined by sensors 88 and 86.

After the temperatures and pressures in the preburner 125 and in the intake manifold 98 have reached normal operating values, the various switches described above are actuated by their associated sensors or regulators. Specifically, under these conditions, temperature sensor 86 actuates switch 84, thus deenergizing heater 90 and valve control solenoid 96A, thereby closing valve 96 and cutting off the flow of fuel. This flow of fuel will remain cut off until such later time when the engine starts inducing air through manifold 98, thus cooling the sensors 86 and 88 and restarting the preheating procedure for the intake air.

In a similar manner, sensor 54 will, under these conditions, actuate switch 70, thereby cutting out the heater 56. Similarly, sensor 52 will cause valve 46 to close to thereby cut off flow of air through nozzle 48 because operating temperature has been reached, and sensor 50 will cause both valves 20 and 40 to be closed because operating pressure has been reached. Finally, pressure sensors 14 and 34 will cause both switches 16 and 36 to be actuated, thus breaking the energizing circuits for motor 60 and thereby removing the drive for pump 12 and compressor 32 so long as the respective pressures are maintained.

With switches 84, 70, 16, and 36 actuated, a circuit is completed between the supply terminals of power supply 78 through the normally open contacts of these switches and relay coil 80A of relay controlled switch 80, thus causing closing of switch 80 from and energization of the starting motor 82. Release of switch 72 connected in series with these switches deenergizes starting motor 82 by deenergizing solenoid 80A.

It is understood that because the preburner 125 is pressurized and at operating temperatures, manifold 129 will supply the fuel output of preburner 125 to provide continuing operation of the intake air preheater as needed and manifold 128 will supply the preburner output to each of the engine cylinder injection valve assemblies 200.

Just prior to turning over of the engine by the starting motor 82, there will be hot pressurized fuel mixture in the various passages and chambers in the injection valve assembly 200, specifically, passages and chambers 216, 215, 214, 213, 212, 211, 221, 226, 220, 219, 218, and 217, described above. At this time, valve 232 is closed, thus preventing fuel from entering the cylinder recess 204A, the valve 232 being closed because of the zero hydraulic pressure in lines 293, 316, and 317, and in chamber 312, due to previous leakage past valve member 300.

As the engine begins to rotate through energization of starting motor 80, natural aspiration on the intake strokes draws air through manifold 98 into inlet passage 331 and past open valve seat 330 into the space above the descending piston 202. On such downstrokes, the exhaust valves are nominally closed, as is conventional, and the injection valve, corresponding to valve 232, for the cylinder is not as yet lifted by its associated cam 322.

Further, with the rotation of the engine, pumps 351 and 353 pressurize the total hydraulic system, and common manifold 294 is under a pressure related directly to the engine speed, as hereinbefore described. As each piston in turn comes to the region of top center following the air compression upstroke, the cam 322 acts to transfer a pressure pulse from valve lift follower piston 310 to valve operating piston 290. Due to the low speed of cranking rotation, and in view of the general increase in leakage effects in the system at low speeds, described above in connection with FIG. 12B, some small but positive opening of valve 232 is provided at the lowest cranking speeds.

As valve 232 opens as described above, the hot combustible gas mixture issues through orifice 210 into a cylinder clearance volume, formed by space 225 and recess 204A, now filled with hot compressed air. Both the fuel and the cylinder air are preheated to at least the temperature of self-ignition and startup is thus prompt and vigorous with even a very cold engine mass. In this regard it is noted that the compressed air charge, in particular, has been preheated, has had but little heat loss in passing through short intake passages, and is further substantially heated within its own mass by adiabatic compression.

Under these circumstances, the speed of rotation of the engine quickly changes from cranking speed to at least idling speed, depending on the operator-controlled position of valve 231. Movement of valve 231 is manually controlled by a foot pedal type accelerator (not shown) which causes torsion bar 270 to depress each valve operating disc 236, as described hereinbefore.

It should be noted regarding the operation of the preburner 125 and the associated intake manifold air preheating subsystem, that these devices are continually cut in and out of operation or modulated in quantitative control to maintain the supply of hot fuel vapor or of intake air, respectively, available in sufficient quantity and at the proper operating temperatures and pressures to ensure continuous operation of the engine as circumstances may require.

Other conditions of operation of the combustion system of the invention include further opening of the manually controlled valve 231 either to increase the engine speed or to develop more power at substantially the same speed. To increase the engine speed, valve 231 is depressed so that more of orifice or passage 211 is exposed to orifice opening 210. Since the hydraulic operation of valve 232 continues to be self-compensating for variations in speed, as hereinbelow described, and illustrated in FIG. 12B, the net effect of movement of valve 231 is, for an orifice-increasing movement, to increase the engine speed. Similarly, if an increased load is imposed on the engine, and the manually controlled valves 231 are depressed to expose a larger part of the area of orifices or ports 211, more fuel per cycle will be admitted at the same speed. The operation of valves 231 can be programed as desired in regard to minimum speed settings, maximum flow rates, shut off when engine is converted to braking on down grades and the like.

In accordance with another aspect of the invention, the hydraulic operation of valves 232 is used to maintain substantially constant engine speed as desired, and by this means also constant road speed for any particular gear ratio of the transmission. Since the pressure in line 294 is maintained automatically at a value which is substantially proportional to the speed of engine rotation, then the engine speed can be kept substantially constant with variable loads imposed on the engine if the pressure in line 294 is applied by force of a piston to rotate torsion bar 270 in the correct direction and amount. This constitutes a feedback type of control, suitable for conventional design including prevention of hunting about the control point. In general, an increase of speed would cause an increase in oil pressure applied to the piston in the cylinder operating upon torsion bar 270, causing the latter to move to a position tending to close somewhat the valve 231.

It will be understood that the embodiment of the invention described above is merely exemplary and that a number of modifications and adaptions may be effected within the scope and spirit of the invention. For example, other arrangements for pressurizing the supply of fuel and air supplied to the preburner 125 can be utilized. Hence, in alternate embodiment, fuel pump 12 could be driven from an air motor, supplied with air at an appropriate pressure from a compressed air storage tank, and refilled by separate air compressor driven by the engine. This tank would also supply air to lines 38 and 39 in place of compressor 32. In addition, such a tank of compressed air could power the engine starting motor 82, thus largely converting the auxiliary power source from electric battery storage to compressed air storage. Further, other auxiliary service devices and operational schemes can be utilized to meet the basic requirements in this regard. It should also be noted regarding the air supply sub-system that air may be supplied at intake 30 in a number of different ways. For example, air may be (1) supplied from the ambient atmosphere, as drawn in through the air cleaner and silencer of the engine; (2) drawn from air compressed by one or more cylinders of the engine itself, serving as a first stage of a two stage compressor operation; or (3) mixed with suitable proportionate quantities of engine exhaust products of combustion, as is now frequently done in the case of conventional spark ignition internal combustion engines for the purpose of reducing pollution in the exhaust itself.

As discussed hereinabove, a very important feature of the invention is the supplying of a completely gasified fuel to the engine cylinders. If a liquid fuel is used, it is a function of the preburner to vaporize the liquid fuel, as described above, by burning part of the fuel internally. However, in stationary engines for example, external heat can be used both to first vaporize the fuel and to then further heat it. If a gas fuel or liquified gas fuel is used, more or less conventional devices, such as pressure reducers, would then be used although a pump will still be needed to prevent the gas from dropping below the injection pressure. Air is not necessarily added in this case although air could be used in burning a part of the gas fuel internally to provide the required heating thereof. Further, as discussed, the gaseous fuel is preferably preheated before injection to a temperature above that required for autoignition. The amount of heating depends, of course, on the temperature of the air mass. The air mass is also preferably preheated, as by preheating the intake air and then adiabatically compressing the air in the engine as discussed. Hence, the important point is that either the fuel or air, or both together must be heated such that, after a heat transfer operation, both will be at the required temperature for autoignition. However, it should be emphasized that heating of both is preferred.

Considering the application of the invention, in the broader aspects thereof, to other areas of interest, it is noted that, for example, the invention may be applied to a so-called continuous flow system such as the combustion system of a jet engine or what is also popularly known as a gas turbine. For such an application, preburner 125 together with a part of the supply and control devices discussed above will function substantially as described to provide a source of hot gasified fuel for the burners of the gas turbine. Specifically, fuel pump 12 and tank 10 would correspond to the jet fuel supply and pump 12 would be directly driven by the turbine itself, whereas fuel lines 18 and 24 and control valve 20 would also be required and would function as described heretofore. Air compressor 32 of FIG. 1 would correspond to the turbo-compressor of the jet turbine itself and air ducts 38 and 39 would receive bleed air, compressed and heated, from the compressor. Control valve 40 and 46 would also function as described, with nozzles 44 and 48 admitting compressed air to the cavity of the preburner 125, and thermal sensor 52 and pressure sensor 50 would, again, operate as discussed, to control valves 46 and 20 and 40, respectively. Finally, heating coil 56 would also function as previously described to initiate burning within the preburner, subject to the conventional operational controls of a gas turbine. On the other hand, the other parts and devices illustrated on FIG. 1 would not be required when adapting the preburner for use in a gas turbine system, the flow of hot gaseous fuel from passage 126 to the burner nozzles of the turbine providing the fuel supply to conventional combustion chambers in place of the liquid fuel injection nozzles customarily employed for conventional liquid fuel turbines. Since the construction and operation of a turbine so adapted would be conventional, and since these aspects of such a turbine form no part of the present invention, further description of the same is not deemed necessary.

Further, it is noted that the preburner could be adapted to drive other devices usually driven by the main engine itself, through the arrangement discussed above in connection with FIG. 1 or even as a part of a gas burning engine system separate from the main (propulsion) engine. For example, in some installations, particularly in heavy duty truck, tractor and off-the-road equipment, there would be substantial advantages accruing from restricting the main engine to propulsion use only, and using the auxiliary power unit including the preburner to power such devices as an air compressor for braking purposes and for starting the main engine, an alternator or generator for electrical power and storage battery recharging, a fan for constant temperature cooling of the main engine, and a refrigeration system for personnel comfort and for temperature control of cargo in trucks or trailers, in addition to uses such as powering a passenger space heater as described above.

As will be understood by those skilled in the art, numerous further modifications and variations in the exemplary embodiments discussed above may be effected within the scope and spirit of the invention and hence it will be appreciated that the modifications which have been specifically discussed are not intended to be in any way exhaustive in this regard.

I claim:

1. A combustion system for an engine comprising air pressurizer means for providing pressurized air, fuel pressurizer means for providing pressurized fuel, preburner means connected to said air pressurizer means and fuel pressurizer means for producing a hot gaseous admixture of fuel vapor and products of combustion which is heated to the temperature for autoignition of said gaseous admixture in air, means defining a combustion space within said engine, fuel release valve means connected to the output of preburner for controlling the release of the said hot gaseous admixture into said combustion space, and means for supplying preheated air to said combustion space to provide burning of said admixture in said preheated air, said preburner means comprising a mixing chamber, at least one fuel nozzle for injecting pressurized fuel into said chamber, at least one air nozzle for injecting a jet of pressurized air into said chamber at least a portion of which jet effects turbulent motion within said chamber so as to cause mixing of said fuel and said air, heating means for aiding in igniting the pressurized fuel, and sensing means responsive to the temperature within said chamber for controlling the output of said fuel nozzle.

2. A system as claimed in claim 1 wherein air pressurizer means includes an air intake manifold and said air heating means for conducting at least a portion of said fuel to said air intake manifold and for burning said portion of fuel in said air intake manifold to heat air inducted into said manifold.

3. A system as claimed in claim 1 further comprising means for causing a flow of air past said fuel release means to promote mixing of the air and the gaseous fuel.

4. A system as claimed in claim 1 wherein said fuel release valve means includes fuel metering valve means for controlling the flow rate of said admixture and fuel timing valve means for controlling the time period during which fuel flow into said air volume is permitted.

5. A system as claimed in claim 4 wherein said fuel metering valve includes a valve member having an opening thereof in communication with the output of said preburner means and, in the release mode thereof, with an inlet to said air volume, and means responsive to the engine operator for controlling the movement of said member so as to control the amount of said opening in communication with said air volume.

6. A system as claimed in claim 5 wherein said release valve means includes a fixed guide member for aiding in guiding the movement of said metering valve member, said timing valve means includes a movable valve head member which cooperates with an end surface of said guide member to provide a variable space between said opening in said metering valve member and the said air volume.

7. A system as claimed in claim 6 wherein said timing valve means includes a movable valve stem affixed to said valve head member and means for controlling the movement of said stem in accordance with engine speed.

8. A combustion system as claimed in claim 1 further comprising a starting motor for said engine, and means for controlling energization of said motor comprising a temperature-sensitive switch actuated responsive to the temperature within said preburner means exceeding a predetermined value, a first pressure-sensitive switch actuated responsive to the pressure of the fuel supplied to said preburner means from said fuel pressurizer means exceeding a predetermined value and a second pressure-sensitive switch actuated responsive to the pressure of the air supplied to preburner means from said air supply source exceeding a predetermined value, a momentary-type starting switch and means for connecting said temperature-sensitive switch, said first and second pressure-sensitive switches, and said starting switch in a series electrical circuit such that all of said switches must be actuated before said starting motor is energized.

9. A combustion system as claimed in claim 8 further comprising an air intake for conducting air to said air volume, means for heating the air within said air intake, and a further temperature-sensitive switch actuated responsive to the temperature within said air intake exceeding a predetermined value and connected in series with said switches in said series circuit.

10. A combustion system as claimed in claim 9 wherein said heating means comprises means for burning at least a portion of said output from said preburner means.

11. A combustion system as claimed in claim 1 further comprising an air intake means for inducting air from the ambient and conducting air so inducted to said air volume, a starting motor for said engine, and means for controlling energization of said starter motor in accordance with the temperature of the air in said intake means.

12. A combustion system as claimed in claim 1 comprising means for controlling starting up of said system comprising an electrical control circuit comprising switch means for controlling connection of said control circuit to a source of electrical energy, an air intake manifold for inducting air and conducting the inducted air to said air volume, means for heating the air in said intake manifold, said heating means including means for conducting at least a portion of the output of said preburner means to said intake manifold and means for causing burning of said portion to provide heating of air inducted into said manifold, heating means within said preburner means for causing burning of said pressurized fuel in air from said source, a starter motor for said engine, and means for controlling energization of said starting motor comprising a first switch means responsive to the temperature within said air intake manifold, a second switch means responsive to the temperature within said preburner means, a third switch means responsive to the pressure of the air supplied to said preburner means, and a fourth switch means responsive to the pressure of the fuel supplied to said preburner means, said electrical control means further comprising an operator-actuated momentary switch and means for connecting said momentary switch and said first, second, third and fourth switches in a series circuit.

13. A combustion system as claimed in claim 12 wherein said second switch means includes means for disconnecting said heating means for said preburner means responsive to the temperature within said preburner means exceeded a predetermined value.

14. A combustion system as claimed in claim 13 wherein said first switch means includes means for terminating flow of said admixture to said intake manifold when the temperature of the air in said intake manifold exceeds a predetermined value.

15. A system as claimed in claim 4 further comprising hydraulic control means for controlling the operation of said timing valve, said hydraulic control means including a hydraulic piston for controlling movement of said timing valve and a camshaft-mounted cam for supplying a pressure pulse to said piston to control the movement thereof.

16. A system as claimed in claim 15 wherein said hydraulic control means includes a further hydraulic piston, passage defining means for providing communication between the further hydraulic piston and the first-mentioned piston, said cam applying an impulse to the said first-mentioned through said further piston and said passage defining means; and means for limiting the flow of hydraulic fluid between said pistons.

17. A system as claimed in claim 16 wherein said flow limiting means comprises a bleed passage connected to the chamber of said second piston and valve means for controlling opening of the bleed passage.

* * * * *